No. 869,565. PATENTED OCT. 29, 1907.
E. J. HAVERLY.
ARTIFICIAL FISHING BAIT.
APPLICATION FILED MAY 28, 1906.

WITNESSES:
D. S. Davies
E. S. Buck.

INVENTOR:
Elmer J. Haverly
by his attorney

UNITED STATES PATENT OFFICE.

ELMER J. HAVERLY, OF SAYRE, PENNSYLVANIA, ASSIGNOR TO THE ENTERPRISE MANUFACTURING COMPANY, OF AKRON, OHIO, A CORPORATION OF OHIO.

ARTIFICIAL FISHING-BAIT.

No. 869,565.  Specification of Letters Patent.  Patented Oct. 29, 1907.

Application filed May 28, 1906. Serial No. 319,025.

*To all whom it may concern:*

Be it known that I, ELMER J. HAVERLY, a citizen of the United States, and a resident of Sayre, county of Bradford, and State of Pennsylvania, have invented a new and useful Improvement in Artificial Fishing-Bait, of which the following is a specification, the principle of the invention being herein explained and the best mode in which I have contemplated applying that principle, so as to distinguish it from other inventions.

The object of the invention is to provide a fishing bait of the class called artificial minnows. The invention consists of the means hereinafter described, and particularly pointed out in the claims.

Figure 1:
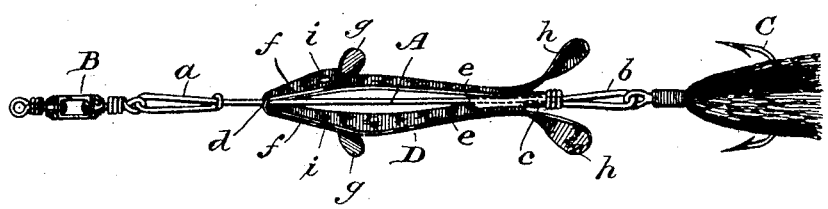
Figure 2:
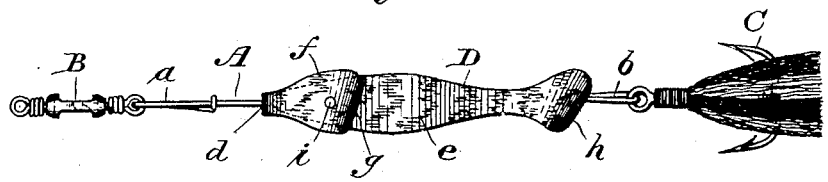
Figure 3:
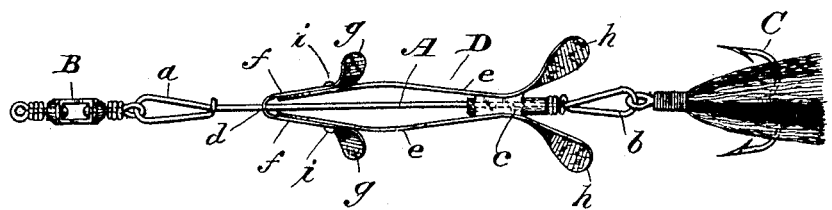

In the drawings: Figure 1 is a perspective view of the artificial fishing bait, constructed in accordance with my invention. Fig. 2 is a longitudinal side view of the artificial bait. Fig. 3 is a top plan view of the artificial bait showing the manner of construction.

Shaft A is formed with eyes $a$ and $b$ at its ends, said eyes formed by bending the shaft back and hooking the outer end upon such shaft. The swivel B by means of which the bait is secured to the line, is attached to the forward eye $a$, the fish hook C being attached to the rearward eye $b$. The shaft serves as a support for the artificial minnow D.

A sleeve C formed between the rear portions of the side pieces of the artificial minnow just forward of the tail, fits freely upon the shaft, which sleeve together with hole $d$ in the head of the minnow—representing the mouth of the minnow—serve as supports for the artificial minnow upon the shaft, and allow the same to rotate freely and rapidly thereon.

The artificial minnow D is formed of three stamped thin metal strips; two of which strips constitute the sides $e$ and the third of which constitutes the head $f$. The head piece of the artificial minnow is deflected outwardly and curvilinearly at its ends in order to form the front fins $g;$ and the side pieces are deflected outwardly and curvilinearly at their rear ends to form the tail fins $h$. These deflections serve as propelling blades to the artificial minnow, and impart a rotary movement thereto as the bait is trolled through the water. The head piece $f$ of the minnow is fastened to the side pieces $e$ by rivets $i$, which also serve to represent the eyes of the artificial minnow.

The artificial fishing bait as above set forth is extremely economical, attractive to a purchaser, and alluring to fish.

In using the above described artificial fishing bait, the operation is apparent: when it is drawn through the water, the pressure of the water upon the deflections of the head and tail pieces, will cause the artificial minnow to be rapidly rotated upon the shaft, thereby producing a deception of a live minnow.

I claim:

1. An artificial fishing bait, comprising three stamped thin metal strips respectively formed to represent the head and two sides of a minnow, the ends of the head piece being formed with outward deflections representing fins and the rear ends of the two sides being similarly formed with outward deflections representing tail pieces, substantially as set forth.

2. An artificial fishing bait, comprising three thin metal strips respectively formed to represent the head and two sides of a minnow, the ends of the head piece being formed with outward deflections representing fins and the rear ends of the two sides being similarly formed with outward deflections representing tail pieces, the two side strips provided with a sleeve fitted between their tail portions, the head strip provided with a hole, said sleeve and hole forming support for said minnow upon said shaft, substantially as set forth.

3. An artificial fishing bait, comprising strips forming its sides, a strip doubled over to represent the head of a minnow and having its respective ends attached to said side strips, said side strips and the ends of said head strip terminating with outward deflections, substantially as set forth.

4. An artificial fishing bait, comprising two strips representing the sides of a minnow, and a third doubled over strip representing the head of such minnow, the ends of such third strip being attached to the respective side strips and being formed with outward deflections, substantially as set forth.

5. An artificial fishing bait, comprising two strips representing the sides of a minnow, and a third doubled over strip representing the head of such minnow, rivets attaching the ends of such doubled over strip to said side strips, the ends of such doubled over strip being formed with outward deflections and the rivets whereby such ends are attached to said side strips representing the eyes of the minnow, substantially as set forth.

6. An artificial fishing bait, comprising three pieces of stamped thin metal strips constituting respectively the sides and head of a minnow said head strip provided with a central shaft hole and having its rear ends respectively deflected outwardly and curvilinearly to form front fins, such rear ends of said head strip fastened to the forward ends of said side strips by rivets representing the eyes of the minnow, said side strips having their rear ends respectively deflected outwardly and curvilinearly to form tail fins and provided with a sleeve forward of said tail fins fastening such side strips together and forming a shaft bearing for same, substantially as set forth.

Signed by me this 7th day of May, 1906.

ELMER J. HAVERLY.

Attested by—
CHAS. C. YOCUM,
MARION HARDING.